United States Patent [19]

Gilbert

[11] Patent Number: 4,703,546
[45] Date of Patent: Nov. 3, 1987

[54] METHOD AND APPARATUS FOR FORMING VALVE CORES

[75] Inventor: Wendell L. Gilbert, Lebanon, Tenn.

[73] Assignee: TRW Inc., Lyndhurst, Ohio

[21] Appl. No.: 835,167

[22] Filed: Mar. 3, 1986

[51] Int. Cl.⁴ .......................... B21D 53/00; B23Q 3/00
[52] U.S. Cl. .............................. 29/157.1 R; 29/283.5; 72/403
[58] Field of Search ............... 29/157.1 R, 407, 283.5; 72/402, 403, 293, 460

[56] References Cited

U.S. PATENT DOCUMENTS

| | | | |
|---|---|---|---|
| 3,800,386 | 4/1974 | Bishop . | |
| 3,921,669 | 11/1975 | Goff | 29/157.1 R |
| 4,100,785 | 7/1978 | Bishop . | |
| 4,103,407 | 8/1978 | Elizalde et al. . | |
| 4,203,477 | 5/1980 | Brüller et al. | 72/403 |
| 4,442,579 | 4/1984 | Millard . | |
| 4,461,163 | 7/1984 | Kralowetz | 72/403 |
| 4,614,014 | 9/1986 | Ferguson | 29/157.1 R |

FOREIGN PATENT DOCUMENTS 3137367 5/1974 Fed. Rep. of Germany .

Primary Examiner—P. W. Echols
Assistant Examiner—Irene Graves Golabi
Attorney, Agent, or Firm—Tarolli, Sundheim & Covell

[57] ABSTRACT

A first locator engages lands defining a first groove in a valve core to position that first groove accurately relative to a first pair of notch forming tools. The first pair of notch forming tools then engage axially extending edges of lands defining that first groove to form metering notches. The first locator and first pair of notch forming tools are disengaged from the valve core. Then, a second locator engages lands defining a second groove to accurately position the valve core relative to a second pair of notch forming tools. The second pair of notch forming tools engage the valve core to form metering notches in the edges of lands defining the second groove. The second locator and second set of notch forming tools are retracted from engagement with the valve core. Thus, the metering notches are precisely and independently formed relative to each land.

14 Claims, 9 Drawing Figures

METHOD AND APPARATUS FOR FORMING VALVE CORES

BACKGROUND OF THE INVENTION

The present invention relates to a new and improved method and apparatus for shaping the edges of flow control lands of a valve core, and more specifically to a method and apparatus for forming fluid flow metering notches in the lands of a valve core.

Power steering control valves of the type disclosed in U.S. Pat. Nos. 3,709,099 and 3,921,669 have a valve core which is rotatable relative to a valve sleeve. The valve core has axially extending lands with axially extending grooves between the lands. The lands and grooves in the valve core cooperate with passages in the sleeve to direct fluid flow to and from a power steering motor. Metering notches have been formed in the edges of the lands in the valve core to provide a metered flow of fluid under pressure through the valve. The metering notches provide a variation in the flow area through the valve to provide the desired power assist characteristics.

The metering notches must be accurately formed relative to the lands. Even slight inaccuracies in forming the metering notches relative to a land results in a different response of the power steering motor upon actuation in one direction than the response which is obtained upon actuation in the other direction.

Prior art methods and apparatus for forming metering notches in valve cores are disclosed in U.S. Pat. Nos. 4,100,785 and 4,103,407 and in German Pat. No. 3,137,367. Typically, the valve core is positioned by a locator, and then the metering notches are simultaneously formed in the edges of a plurality of lands of the valve core by a plurality of tools which are simultaneously brought into engagement with the edges of the lands. Due to manufacturing tolerances, one or more of the lands may be slightly displaced from their intended position relative to other lands. Thus, the metering notch formed on one side of a displaced land may be slightly wider than the intended width of the metering notch, while the metering notch on the other side of the land may be slightly narrower than its intended width. Due to the difference in the configuration of the metering notches on opposite sides of the land, the response of the power steering motor to rotation of the valve core in opposite directions will be somewhat different. In high pressure hydraulic fluid flow control, small differences in flow area can produce large differences in result. Hence, extreme accuracy in forming flow control edges is critical.

SUMMARY OF THE PRESENT INVENTION

The present invention provides a new and improved method and apparatus for manufacturing a valve core with precisely located and formed metering notches. In practicing the invention, a first locator engages surfaces of lands on opposite sides of one of a plurality of grooves formed in the valve core to position that groove and lands relative to a first set of notch forming tools. Metering notches are then formed in only the edges of the lands on opposite sides of that groove. Since the surfaces of only the lands in which the metering notches are to be formed is engaged by the locator to position the valve core, a slight inaccuracy in the location of the lands relative to other lands does not result in inaccurate formation of the metering notches in the land edges.

Once the metering notches have been formed in the edges of at least one of the lands, the first locator is disengaged from the land surfaces defining the groove. A second locator is then moved into engagement with land surfaces defining the next groove to position the next land relative to a second set of notch forming tools. Once the next land has been positioned relative to the second set of notch forming tools, the metering notches are formed in the edges of the next land. Thus, any inaccuracy in the location of the next lands or groove relative to the other lands or grooves does not result in inaccuracy in the configuration of the notches in the land edges defining the next groove.

BRIEF DESCRIPTION OF THE DRAWINGS

The foregoing and other objects and features of the present invention will become more apparent to one skilled in the art upon a reading of the following specification made with reference to the accompanying drawings, wherein.

DESCRIPTION OF ONE SPECIFIC PREFERRED EMBODIMENT OF THE INVENTION

The present inventon relates to the manufacture of a valve and particularly to the formation of notches in the edge of a land of a valve core which rotates within a valve sleeve. Valves made in accordance with the invention may have many uses and may be of different constructions. The valve described herein is a valve for use in a hydraulic power steering mechanism.

Figure 1:
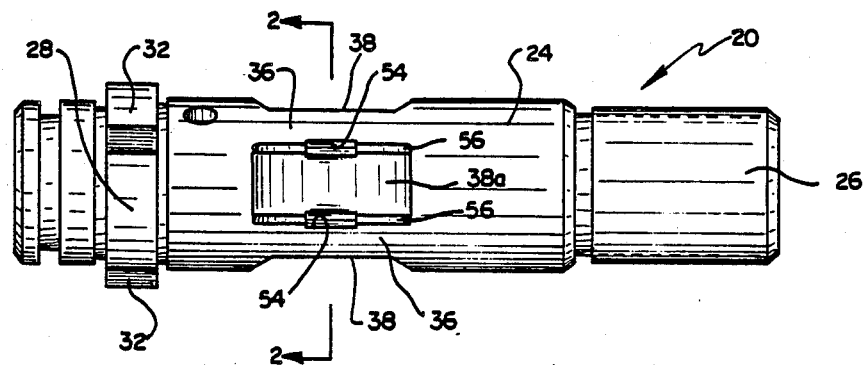
FIG. 1 is a side elevational view of a valve core having lands with metering notches in the edges thereof.
Figure 2:
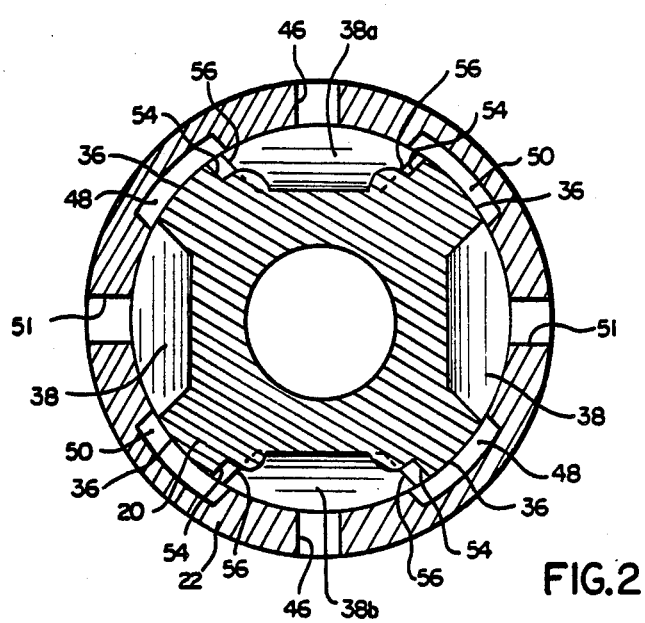
FIG. 2 is a cross sectional view of the valve core of FIG. 1, taken approximately along the line 2—2 of FIG. 1 and illustrating a valve sleeve which cooperates with the valve core.

The valve includes a valve core 20 (FIG. 1) received in a valve sleeve 22 (FIG. 2). The valve core 20 (FIG. 1) has a generally cylindrical body 24 having an input end portion 26 and a distal end portion 28. The input end portion is connectable with a shaft (not shown) fixed to the steering wheel of the vehicle. The distal end portion 28 has a pair of drive keys 32 for connection with a worm shaft (not shown) of a power steering gear, as is known.

The cylindrical body 24 of the valve core 20 has a plurality of lands 36 on its outer surface defining a plurality of axially extending grooves 38. FIG. 2 illustrates the valve core 20 and sleeve 22 cooperating in a neutral position in an open center power steering valve. In this neutral position, pressurized fluid is delivered from a pump through inlets 46 into grooves 38a and 38b. The fluid is then directed over the lands 36 through ports 48 and 50 which communicate with respective chambers in a power steering motor. The fluid is then directed from ports 48 and 50 through the grooves 38 into outlets 51 which are connected with a fluid reservoir.

Upon rotation of the valve core 20 relative to the sleeve 22 fluid pressure is increased in respective power steering motor chambers. For example, if the valve core 20 is rotated counterclockwise, as viewed in FIG. 2, ports 48 are further exposed to inlets 46 while being further restricted from the outlets 51. Simultaneously, ports 50 are further restricted from inlet 46 while further exposed to outlets 51. Thus, the power steering chamber connected with ports 48 is further pressurized to actuate a power steering motor in one direction. It will be obvious that rotating the valve core 20 clockwise, as viewed in FIG. 2, functions to similarly pressurize the chamber connected with ports 50 to actuate the power steering motor in another direction.

Metering notches 54 are selectively provided in some of the axially extending edges 56 of the lands 36. The metering notches 54 provide a gradual and controlled variation of the fluid flow area at one edge 56 of a land 36 upon rotation of the valve core 20, as is known.

In accordance with the present invention, the metering notches 54 are simultaneously formed in both edges 56 of one land 36 after that one groove defined by the lands has been accurately positioned relative to forming tools. Thus, a first groove 38a (FIG. 5) is accurately positioned by a first locator 62 relative to a first set of forming tools 64. The metering notches 54 are formed in the first two lands 36 and then the locator 62 and forming tools 64 are disengaged from the valve core 20. Then, the second groove 36b is accurately positioned by a second locator 72 relative to a second set of forming tools 74. The metering notches 54 are then formed in the second lands 36 by the second set of forming tools 74 while the first locator 62 is not engaged with the valve core 20.

The valve core 20 produced in accordance with the present invention has the advantage that each groove 38a and 38b is separately positioned before the metering notches 54 are formed in the lands defining such groove. Therefore, any misalignment of the grooves 38 with respect to each other due to manufacturing tolerance stack-up does not affect the accuracy of location of the metering notches 54 relative to a particular land. For example, if one groove 38 is circumferentially offset somewhat relative to other grooves, the metering notches 54 are nonetheless accurately formed in the lands defining both of the grooves.

The apparatus embodying the present invention engages the surfaces of a first set of lands 36 defining a first groove 38a to position the first set of lands and then forms metering notches 54 in the edges 56 of that first set of lands. The apparatus then disengages the first set of lands. The apparatus then engages the surfaces of a second set of lands 36 defining a second groove 38b and forms metering notches 54 in the edges 56 of the second set of lands 36.

Figure 3:
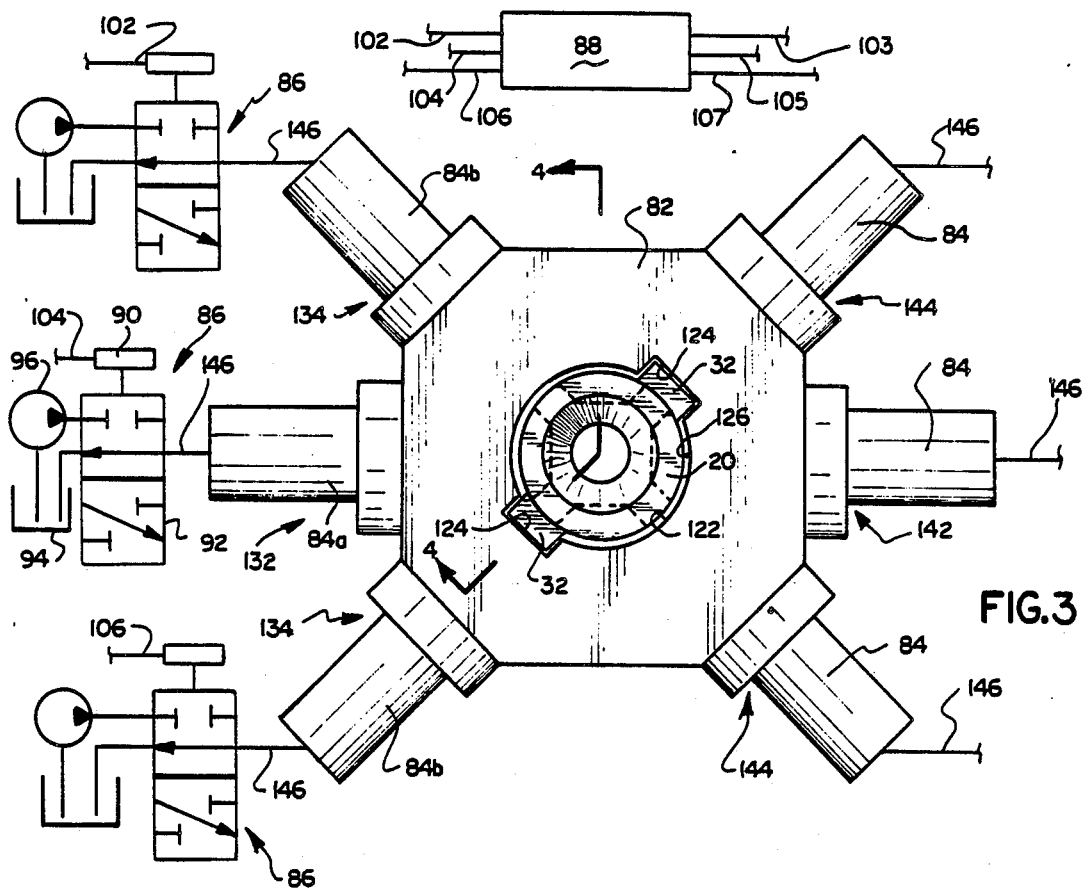
FIG. 3 is a schematic view of an apparatus constructed in accordance with the present invention.

The apparatus of the present invention includes a fixture 82 (FIG. 3) with six hydraulic cylinders 84 attached. Each hydraulic cylinder 84 is actuated by a fluid circuit 86. FIG. 3 illustrates the fluid circuits 86 schematically on the left side of the apparatus and has eliminated them from the right side of the apparatus for simplicity. It will be obvious that similar fluid circuits are also used on the right side of the apparatus in FIG. 3. A programmable controller 88 operates to control the solenoids 90 of the fluid circuits 86 for timing the sequence as to when each hydraulic cylinder 84 is actuated.

Each of the hydraulic cylinders 84 is of the single-acting piston type, as is known. The hydraulic cylinder 84 is spring biased to the normally retracted position illustrated in FIG. 5. Fluid is directed to the hydraulic cylinder 84 (FIG. 3) by the control valve 92 of the fluid circuit 86. The control valve 92 normally vents the hydraulic cylinder 84 to the reservoir 94. Fluid is selectively delivered from a supply pump 96 through the control valve 92 to the hydraulic cylinder 84 when the solenoid 90 receives an actuating signal from the programmable controller 88. Although FIG. 3 illustrates three separate reservoirs 94 and pumps 96, it will be obvious that one pump and one reservoir could be fluidly connected with all of the cylinders 84. Each solenoid 90 is electrically connected to the programmable controller 88 by wires 102, 104 or 106. Wires 103, 105 and 107 are electrically connected to solenoids (not shown) on the right side of the apparatus in a similar manner.

Figure 4:
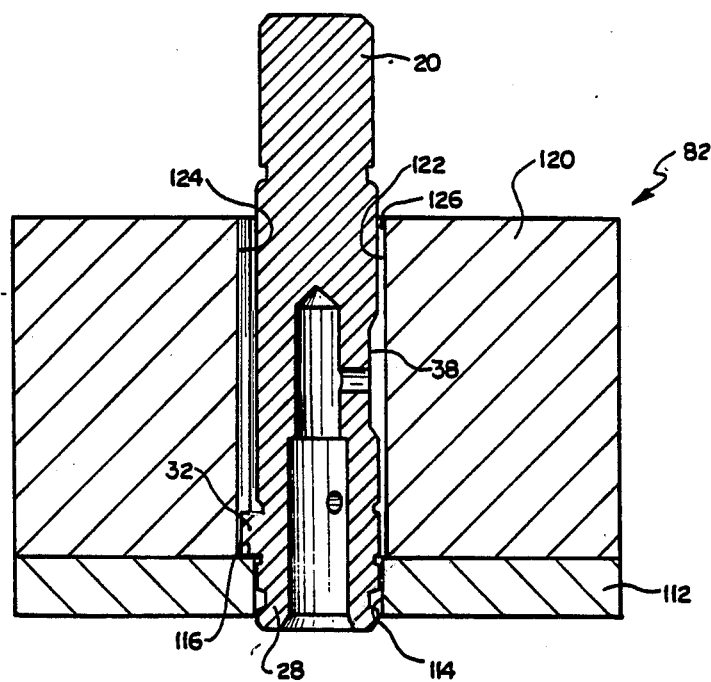
FIG. 4 is a cross sectional view of the apparatus of FIG. 3, taken approximately along line 4—4.

The fixture 82 (FIG. 4) includes a base plate 112 with a circular opening 114 to allow the distal end portion 28 of the valve core 20 to extend through the base plate. The base plate 112 has a resting surface 116 for the drive keys 32 to engage to support the valve core 20 and prevent the valve core 20 from further downward axial movement relative to the fixture 82.

Figure 5:
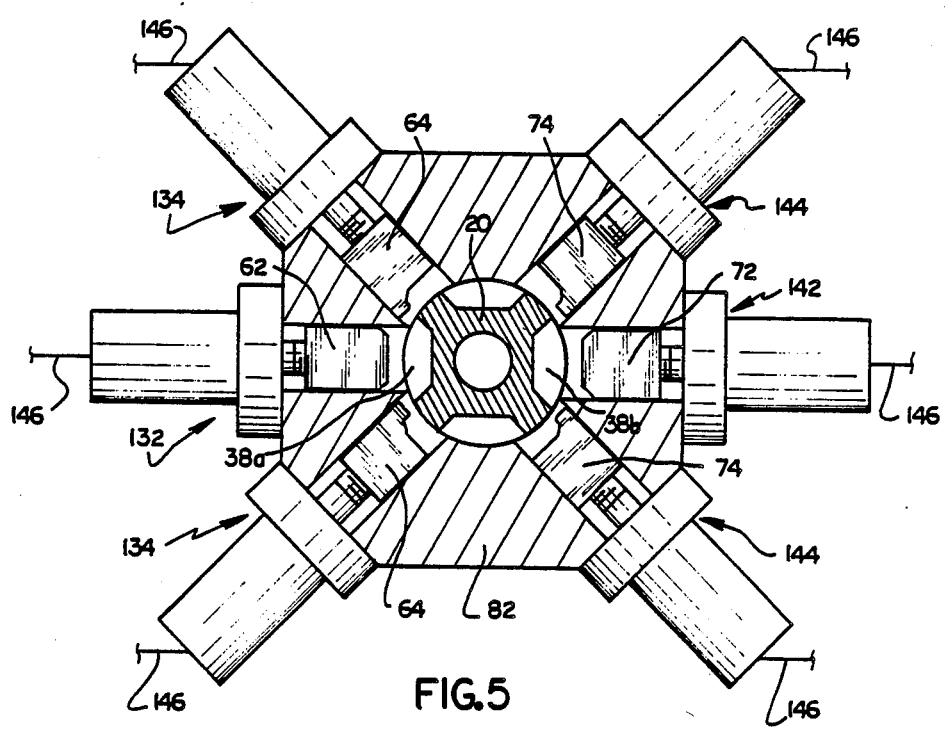
FIG. 5 is a schematic cross sectional view of the apparatus of FIG. 3 illustrating locators and tools of the apparatus in a retracted position just prior to forming metering notches in a land of a valve core.

The fixture 82 also includes an upper portion 120 attached to the base plate 112. The upper portion 120 has a circular opening 122 for the valve core 20 to axially extend through. The upper portion 120 also has a pair of slots 124 (FIG. 3) extending therethrough, so that the drive keys 32 do not contact the upper portion 120 as the valve core 20 is longitudinally extended through the opening 122. The slots 124 also serve to rough position the valve core 20 so that the grooves 38a and 38b are approximately in a desired position relative to the locators 62 and 72 (FIG. 5). The circular openings 114 and 122 (FIG. 4) are slightly larger than the outside diameter of the valve core 20. This allows a gap or clearance 126 (FIG. 3), to exist so that the valve core 20 can easily be passed through the circular openings 114 and 122.

The apparatus has a first locating assembly 132 (FIG. 5), which includes the first locator 62, for engaging the surfaces defining a first groove 38a. A first set of coining punches 134 includes a pair of forming tools 64 for forming metering notches 54 in opposite edges of a first set of lands 36.

The apparatus also has a second locating assembly 142, which includes the second locator 72, for engaging the surfaces defining a second groove 38b. A second set of coining punches 144 includes a pair of forming tools 74 for forming the metering notches 54 in the edges of the second set of lands 36.

The valve core 20 (FIG. 3) is telescopically inserted through the opening 122 in the fixture 82. The drive keys 32 (FIG. 4) engage the resting surface 116 of the base plate 112 to prevent any further downward axial movement of the valve core 20. The gap 126 (FIG. 3) permits the valve core 20 to move slightly in a rotational and linearly transverse direction relative to the valve core axis.

Figure 6:
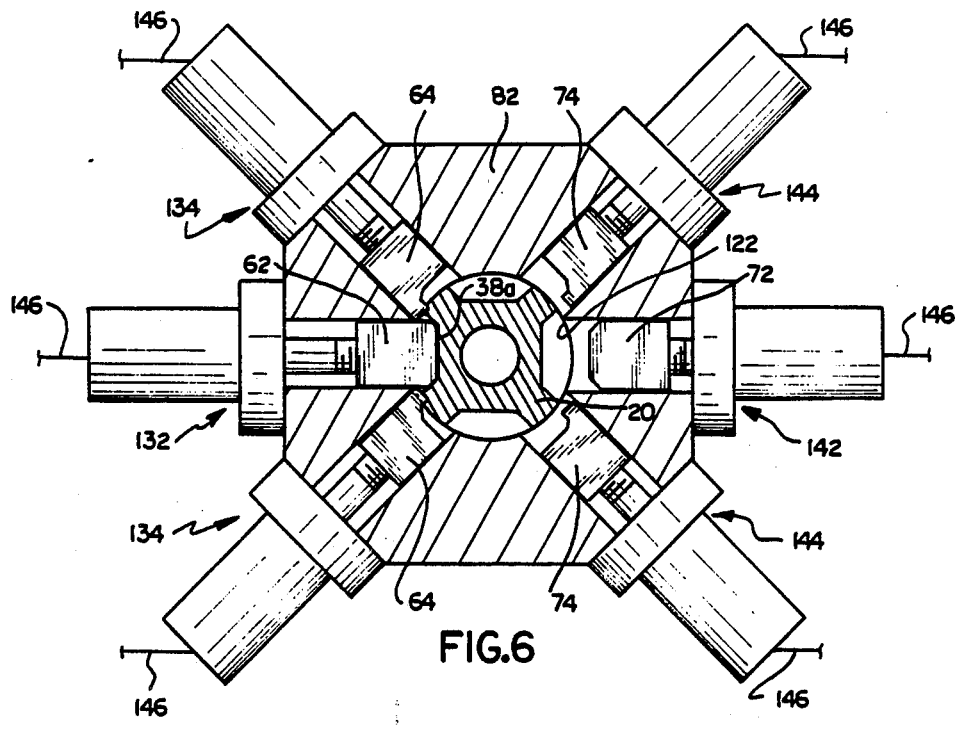
FIG. 6 is a cross sectional view, similar to FIG. 5, illustrating how a first locator and a first set of tools engage lands in the valve core during the formation of metering notches in edges of the lands.

The first locating assembly 132 is actuated by a signal from the programmable controller 88 to extend inwardly towards the mounted valve core 20. The solenoid 90 associated with the first locating assembly 132 receives the signal from the programmable controller 88 through wire 104 (shown broken for simplicity). The solenoid 90 changes the position of the control valve 92 to direct pressure from the pump 96 to the hydraulic cylinder 84a through hydraulic line 146. Hydraulic pressure exerts a force on the piston in the cylinder 84a, as is known, to extend the locator tool 62 from its retracted position of FIG. 5 to engage the mounted valve core 20, as illustrated in FIG. 6. The first locator 62 is shaped similar to the groove 38a configuration.

Figure 7:
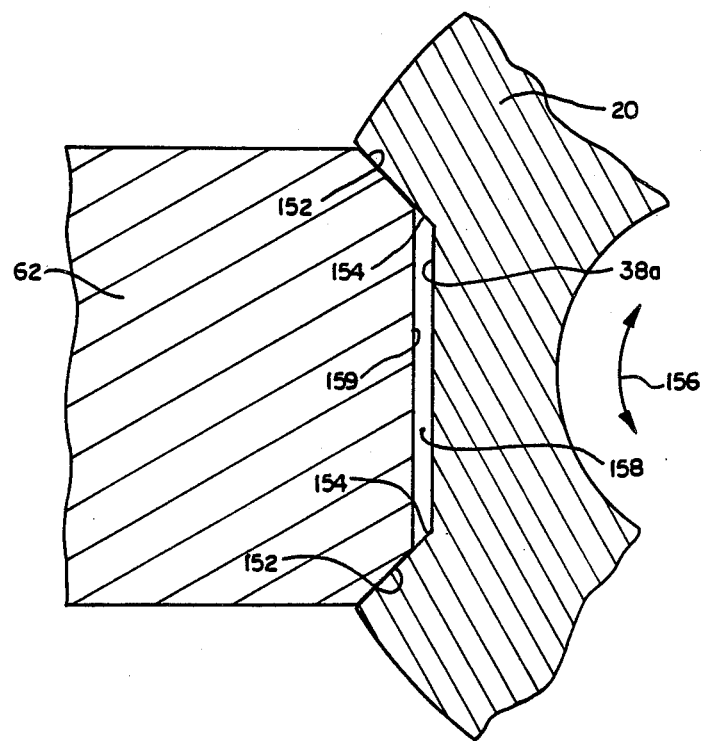
FIG. 7 is a fragmentary enlarged cross sectional view illustrating the locator in FIG. 6 engaging lands to locate the valve core in a desired position.

As the first locator 62 is extended, locator surfaces 152 (FIG. 7) engage the groove sides 154. This causes the valve core 20 to rotate in either direction 156 in order to be properly positioned relative to the first set of forming tools 64 (FIG. 5). A clearance gap 158 exists between the bottom surface of the groove 38a and the leading edge 159 of the first locator 62. This assures that the locator surfaces 152 contact only the groove sides 154. Extending the first locator 62 to engage the valve core 20, forces the cylindrical body 24 and lands 36 of the valve core to contact the circular openings 114 and 122 (FIG. 4) of the fixture 82 opposite the first locator. This solidly holds the valve core 20 in the desired position for coining the metering notches 54.

Figure 8:
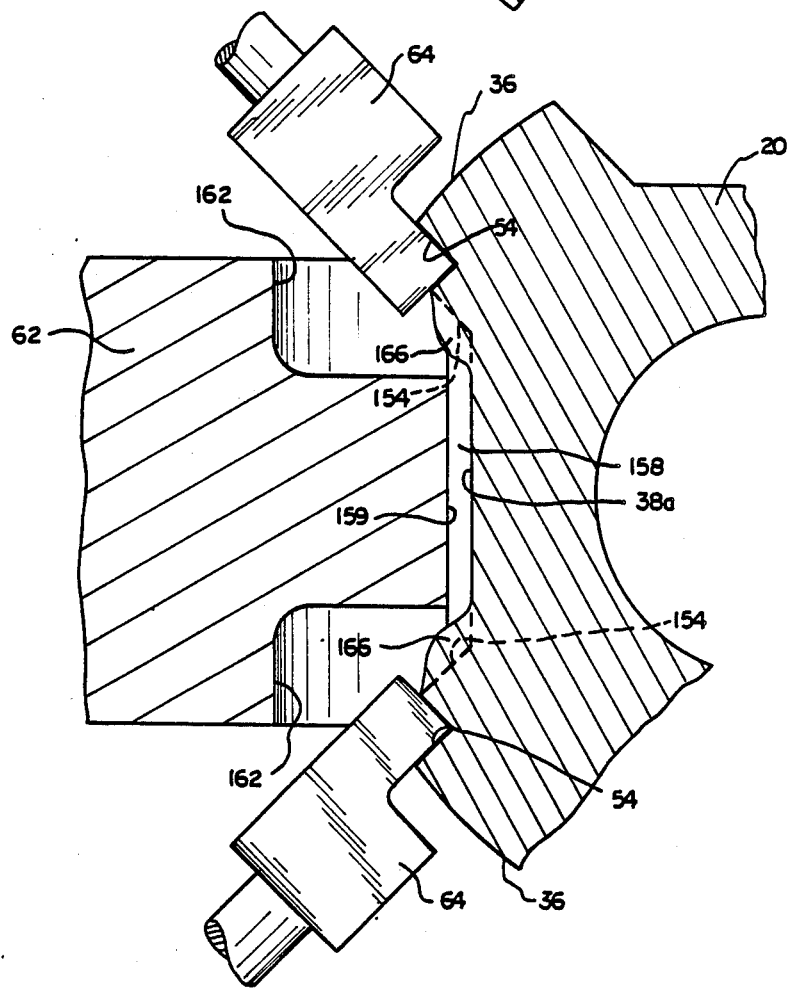
FIG. 8 is a fragmentary enlarged cross sectional view illustrating the locator in FIG. 7 maintaining the desired position of the valve core while a pair of tools form metering notches.

The first locator 62 has a pair of recesses 162 (FIG. 8) to prevent contact with the first set of forming tools 64 upon their extension to engage the valve core 20. The recesses 162 also prevent displaced material 166 from engaging the first locator 62 during formation of the metering notch 54. This assures that the displaced material 166 does not reposition the valve core 20 during formation of the metering notch 54.

Once the groove 38a is located accurately relative to the first set of forming tools 64, metering notches are formed in the groove sides 154 where they intersect the lands 36. The hydraulic cylinders 84b (FIG. 3) are operated simultaneously to move the punches from a retracted position, as seen in FIG. 5, to the extended position illustrated in FIG. 6. As the first set of forming tools 64 extend, the nose or leading edge of the forming tools engages the land 36 adjacent to the groove 38a. The nose of the forming tool pushes metal of the land inwardly to form the metering notch 54 in the lands 36. The first set of forming tools 64 are adjusted to stop, as is known in the art, at a predetermined depth.

Once the first set of forming tools 64 have formed the metering notches 54 to their predetermined depth, the first set of coining punches 134 are activated by the programmable controller 88 to move from their extended position back to the retracted position illustrated in FIG. 5. Next, the programmable controller 88 signals the first locating assembly 132 to move from its extended position, engaging the valve core 20, back to the retracted position illustrated in FIG. 5.

During the formation of the metering notches 54, only the first locator 62 engages the valve core 20. The second locator 72 remains in its retracted position as illustrated in FIG. 6. Therefore, the valve core 20 was accurately positioned in order to form the metering notches 54 only in the lands 36 defining first groove 38a.

Figure 9:
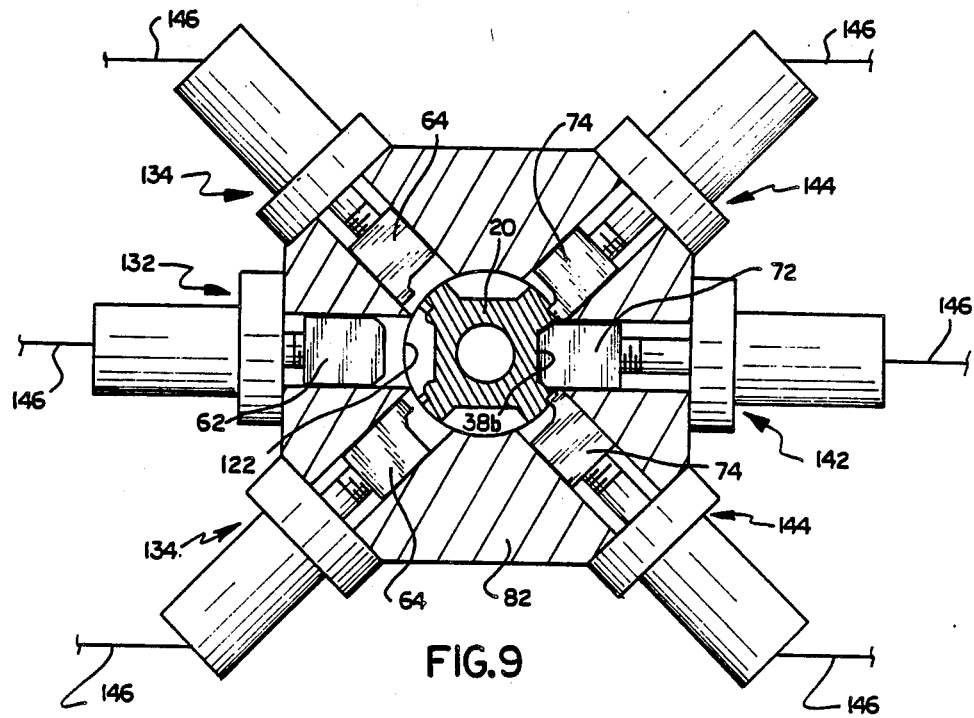
FIG. 9 is a cross sectional view, similar to FIG. 5, illustrating a second locator and a second set of tools acting on the valve core.

After metering notches 54 are formed and the first locator 62 and the first set of coining tools 64 are retracted, the apparatus is ready to form metering notches in the lands 36 defining the second groove 38b. The second locating assembly 142 (FIG. 5) is then actuated to extend from the retracted position illustrated in FIG. 5, to the extended position illustrated in FIG. 9. The second locator 72 engages sides of the second groove 38b as described above for the first locator 62 engaging the first groove 38a. The valve core 20 can move slightly to accurately locate the sides of the second groove 38b relative to a second set of forming tools 74.

The second set of coining punches 144 is then signaled to extend by the programmable controller 88. The second set of forming tools 74 then engage the valve core to form metering notches 54 similar to the manner described above for the first groove 38a. At this time, the first locator 62 and the first set of forming tools 64 are in their retracted position out of engagment with the valve core 20.

The programmable controller 88 signals the second set of coining punches 144 to retract from engagement with the valve core 20. The programmable controller then signals the first locating assembly 142 to move to the retracted position illustrated in FIG. 5. The valve core 20 is then removed from the fixture 82.

Having described a specific preferred embodiment of the invention, the following is claimed:

1. An apparatus for sequentially forming at least one metering notch in the edges of a plurality of lands in a valve core, said apparatus comprising:

first tool means for forming a metering notch in the edge of a first land in the valve core;

second tool means for subsequently forming a metering notch in the edge of a second land in the valve core;

first locator means operable from a retracted condition spaced from the valve core to an extended condition to engage surfaces defining the first groove in the valve core to move the valve core to a desired position relative to said first tool means;

second locator means operable from a retracted condition spaced from the valve core to an extended condition to engage surfaces defining the second groove in the valve core to move the valve core to a desired position relative to said second tool means;

means for operating said first tool means to form a metering notch in the first land edge while said first locator means is in the extended condition and said second locator means is in the retracted condition; and means for operating said second tool means to form a metering notch in the second land edge while said second locator means is in the extended condition and said first locator means is in the retracted condition.

2. Apparatus as set forth in claim 1 wherein said first locator means includes first surface means for engaging a first side surface of the first groove and second surface means for engaging a second side surface of the first groove while said second locator means is in the retracted condition to thereby position the valve core to a desired position relative to said first tool means.

3. An apparatus as set forth in claim 2 wherein said first tool means includes means for deforming an edge portion of the land while said first surface means is in engagement with the first side surface of the groove and said second surface means is in engagement with the second side surface of the groove.

4. An apparatus as set forth in claim 3 wherein said first surface means at least partially defines a recess formed in said locator means, said first tool means being operable to force material of the valve core into the recess during forming of the metering notch in the land.

5. An apparatus as set forth in claim 1 further including means for supporting the valve core for rotation about a central axis of the valve core under the influence of forces applied to the valve core by said first and second locator means.

6. An apparatus as set forth in claim 5 wherein said means for supporting the valve core further includes internal surface means of a generally cylindrical shape for engagement with the valve core under the influence of forces applied to the valve core by said first and second locator means.

7. An apparatus as set forth in claim 1 wherein said first tool means is operable to simultaneously form two metering notches in the lands defining a first located groove, and said second tool means is operable to simultaneously form two metering notches in the lands defining a second separately located groove.

8. A method for shaping the edges of circumferentially spaced lands in a valve core, said method comprising the steps of:
supporting the valve core;
actuating first locator means from a retracted position to engage lands defining a first groove and locate the valve core relative to first tool means;
actuating the first tool means from a retracted position to engage the valve core and shape the edges of the lands defining a first groove;
withdrawing the first tool means and the first locator means from engagement with the valve core to respective retracted positions;
actuating second locator means from a retracted position to engage lands defining a second groove and locate the valve core relative to second tool means;
actuating the second tool means from a retracted position to engage the valve core and shape the edges of the lands defining a second groove; and
withdrawing the second tool means and the second locator means from engagement with the valve core to respective retracted positions.

9. A method as set forth in claim 8 wherein said step of actuating first locator means from a retracted position to engage lands defining a first groove and locate the valve core relative to first tool means further includes the first locator means having first surface means for engaging a first side surface of the first groove and second surface means for engaging a second side surface of the first groove.

10. A method as set forth in claim 9 wherein said step of actuating the first tool means from a retracted position to engage the valve core and shape the edges of the lands defining the first groove further includes the first tool means having means for deforming a portion of an edge of lands defining the first groove while the first surface means is in engagement with the first side surface of the first groove and the second surface means is in engagement with the second side surface of the first groove.

11. A method as set forth in claim 10 wherein said step of actuating the first tool means from a retracted position to engage the valve core and shape the edges of lands defining the first groove further includes the first surface means at least partially defining a recess in the first locator means for displaced material to enter during the shaping of the edges in the first groove.

12. A method as set forth in claim 8 wherein said step of actuating the first tool means from a retracted position to engage the valve core and shape the edges of lands defining the first groove further includes means operable to simultaneously shape two edges in lands defining the first groove while engaged by first locator means.

13. A method as set forth in claim 8 wherein said step of supporting the valve core further includes means for supporting the valve core for rotation about a central axis of the valve core under the influence of forces applied to the valve core by the first and second locator means.

14. A method as set forth in claim 13 wherein said step of supporting the valve core further includes internal surface means of a generally cylindrical shape for engaging the external surface of the valve core under the influence of forces applied to the valve core by said first and second locator means.

* * * * *